United States Patent [19]

Eberhardt et al.

[11] Patent Number: 4,692,263

[45] Date of Patent: Sep. 8, 1987

[54] STRIPPING PASTE FOR REMOVING LACQUER AND PAINT COATINGS

[75] Inventors: Werner Eberhardt, Leichlingen; Rudolf Ziegler, Kuerten, both of Fed. Rep. of Germany

[73] Assignee: Henkel Kommanditgesellschaft auf Aktien, Duesseldorf, Fed. Rep. of Germany

[21] Appl. No.: 898,987

[22] Filed: Aug. 21, 1986

[30] Foreign Application Priority Data

Sep. 26, 1985 [DE] Fed. Rep. of Germany ........ 3534278

[51] Int. Cl.$^4$ ................................................ C11D 7/50
[52] U.S. Cl. .................................... 252/122; 252/118; 252/132; 252/DIG. 8; 134/38
[58] Field of Search ............... 252/118, 122, 132, 158, 252/159, 173, 170, DIG. 14, DIG. 8; 134/38

[56] References Cited

U.S. PATENT DOCUMENTS

| | | | |
|---|---|---|---|
| 2,898,246 | 8/1959 | Hannah | 134/38 |
| 3,216,945 | 11/1965 | Mankowich | 252/DIG. 8 |
| 3,702,304 | 11/1972 | Esposito | 252/DIG. 8 |
| 4,353,745 | 10/1982 | Ebbeler | 134/38 |
| 4,592,787 | 6/1986 | Johnson | 252/158 |

Primary Examiner—Paul Lieberman
Assistant Examiner—Hoa Van Le
Attorney, Agent, or Firm—Ernest G. Szoke; Henry E. Millson, Jr.; Real J. Grandmaison

[57] ABSTRACT

A stripping paste for removing lacquer and paint coatings based on substantially involatile, low toxicity solvents and thickeners, comprising:

(a) from 94 to 66% and more especially from 88 to 72%, by weight of a diethylene glycol monoalkyl ether corresponding to the following general formula

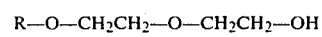
$$R-O-CH_2CH_2-O-CH_2CH_2-OH$$

in which R is an ethyl or propyl group, (b) from 1 to 4%, and more especially from 1.5 to 3%, by weight of the sodium salt of a $C_{14}$–$C_{18}$ fatty acid, (c) from 5 to 30%, and more especially form 10 to 25%, by weight of water, and (d) optionally up to 5% by weight of nonionic or anionic active wetting agents and other standard thickening auxiliaries.

20 Claims, No Drawings

STRIPPING PASTE FOR REMOVING LACQUER AND PAINT COATINGS

BACKGROUND OF THE INVENTION

1. Field of the Invention

This invention relates to a stripping paste for removing lacquer and paint coatings based on substantially involatile, low-toxicty solvents in conjunction with thickeners.

2. Discussion of Related Art

Stripping preparations for stripping lacquers and emulsion paints based on polar and non-polar solvents in conjunction with one or more thickeners are known. The thickeners used may be waxes or wax-like substances which are incorporated in the solvents in molten form. In addition to these waxes, it is also possible to use other known thickeners, for example those based on natural or synthetic alumino-silicates. The content of wax or wax-like components stirred in as melts should amount to approximately 10 parts by weight, from 20 to 30 parts by weight of a so-called non-polar solvent having to be present at the same time.

Unfortunately, known stripping preparations such as these are not satisfactory in every respect. In particular, it is necessary to use relatively large quantities of solvents which, on account of their specific properties, pollute the immediate environment or even the wastewater.

3. Description of the Invention

Accordingly, the object of the present invention is to develop stripping pastes which, on the one hand, provide for the satisfactory and easy removal of lacquer coatings of various kinds and even for the removal of emulsion paints based on synthetic or natural rubber latices and also residues of adhesives but which on the other hand, constitute a negligible source of pollution to the surrounding environment and a decreased burden on the wastewater.

Other than in the operating examples, or where otherwise indicated, all numbers expressing quantities of ingredients or reaction conditions used herein are to be understood as modified in all instances by the term "about".

The present invention relates to a stripping paste for removing lacquer and paint coatings, said stripping paste being based on substantially involatile, lowtoxicity solvents and thickeners based on fatty acid salts, and comprising:

(a) from 94 to 66% by weight, and more especially from 88 to 72% by weight, of a diethylene glycol monoalkyl ether corresponding to the following general formula

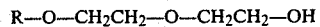

in which R is an ethyl or propyl group;
(b) from 1 to 4%, and more especially from 1.5 to 3%, by weight of the sodium salt of a $C_{14}$–$C_{18}$ fatty acid:
(c) from 5 to 30%, and more especially from 10 to 25%, by weight of water; and
(d) optionally up to 5% by weight of nonionic or anionic wetting agents and other standard thickening agents.

The use of relatively large quantities of a diethylene glycol monoalkyl ether corresponding to the above formula is particularly characteristic of the present invention. When R is an ethyl or propyl group, the result according to the invention is readily achieved. However, if R has a longer or shorter chain, i.e. where R is a methyl group, the stripping effect is weaker. The volatility of the methyl ether is also too great to develop an effect of sufficient duration. If R is a relatively long alkyl group or even an aryl group, the scope of application of the stripping paste with respect to various coatings diminishes. Another important requirement is that the free OH group should be present, i.e. it should be neither etherified nor esterified, as is the case with many other known solvents of similar structure, which, in principle, are also suitable as lacquer solvents and hence are at least theoretically suitable for the purpose of stripping. However, their attack on the lacquer coating is not as good, i.e. universal, as is the case with the particular ethyl and propyl ethers of diethylene glycol used in accordance with the invention.

It is of course also possible to use other solvents in the systems according to the invention for special purposes. Suitable solvents include solvents which are similar in structure to the monoalkyl ether of diethylene glycol, containing for example, another alkoxy group instead of the OH-group. Typical examples of compounds such as these are monoalkyl ($C_2$–$C_6$) ethers of diethylene glycol acetate and/or propionate. In this case, however, it is important to bear in mind that compounds such as these should be used in only very small amounts, for example in quantities not exceeding 5 to 10%, because otherwise the favorable properties of the universal, good stripping effect and the negligible pollution of the environment based on this invention will be diminished.

In the case of the sodium salts of the fatty acids, the desired thickening effect is readily obtained with a quantity of from 1 to 4%, based on the stripping preparation as a whole. It is of course also possible to use a somewhat larger quantity, although the sodium salt cannot be replaced in regard to its thickening effect by the triethanolamine salt for example or even by the potassium salt. The fatty acids may be unsaturated to a certain extent of up to about 20 to 50% of the carbon bonds. This limit should not be exceeded because otherwise the thickening effect is clearly reduced. This results in running of the final paste down vertical surfaces.

Finally, it is also possible to use nonionic or anionic wetting agents in addition to the three compounds mentioned as essential. However, they should not exceed a content of 5% by weight, based on the three essential constituents. Commercial nonionic and anionic wetting agents are preferred. In special cases, wetting agents containing quaternary groups may be used. In such case, however, it is important in particular to bear in mind the other secondary effects which frequently occur. It is only in special cases that these wetting agents containing cationic groups afford particular advantages in regard to the stripping effect.

Another active component which may be present is a certain excess of alkali metal salt which may be added in particular in the form of excess sodium hydroxide, potassium hydroxide, potassium carbonate, sodium carbonate or the like. The use of calcium hydroxide is not recommended because, in such case, insoluble calcium salts are separated and reduce the thickening effect of the sodium salts of the $C_{14}$–$C_{18}$ fatty acids.

In addition, thickening systems known per se based on silicates of natural or synthetic origin, for example on montmorillonite or bentonite, are also suitable auxiliaries. Precipitated silica or silica obtained by vaporphase hydrolysis may also be added. It is also possible to use organic compounds of relatively high molecular weight to improve the levelling and stripping properties, for example, dispersions of poly(meth)acrylic acid, polyvinylpyrrolidone and copolymers thereof, copolymers of maleic acid or semisynthetic compounds based on starch, cellulose, for example, methyl cellulose, carboxymethyl cellulose, nitrocellulose, or guar derivatives.

To prepare the stipping pastes according to the invention, the constituents are mixed with one another, wherein the monoalkyl ether of diethylene glycol is preferably introduced first, and the free fatty acids dissolved therein. The fatty acids are dissolved by addition of sodium hydroxide with gentle heating to about 20° to 50° C. The additional water required is also best added at this stage so that the final paste has a water content of from 5 to 30% by weight. After the homogeneous mixture has been prepared with stirring and, optionally, continued heating, it may be packed in containers.

The paste according to the invention is a paste thickened by the sodium salts of the fatty acids and not a gel per se of sodium salts of fatty acids in hydrophilic organic solvents.

For practical application, the stripping pastes according to the invention are suitably applied to the surfaces to be stripped using a brush or spatula and left to act for various periods at room temperature. A contact time of from 2 to 48 hours is generally sufficient, depending on the resistivity of the lacquer, emulsion or adhesive remains. Ordinarily, the desired results will be obtained overnight, i.e. over a period of from about 12 to 15 hours. The softened lacquer coating may then be scraped off using a suitable tool, for example a paint scraper. The remains of the stripping paste are then washed off with water and dried. If desired, the surface may then be further mechanially cleaned or a second partial coating of the stripping paste applied thereto before a new paint or lacquer is applied.

PRODUCTION OF STRIPPING PASTES

(Examples 1 to 5)

The monoethyl ether of diethylene glycol, the adduct of 10 moles ethylene oxide with 1 mole of an oleyl alcohol/cetyl alcohol mixture and various fatty acids, namely myristic acid, palmitic acid and stearic acid, were introduced into a stirring vessel. The quantity of sodium hydroxide required for neutralization was then added, followed by stirring for 5 minutes at 40° C.

More water or other auxiliaries were then optionally added with continued stirring. After the mixture had become homogeneous, it was packed in tin cans.

The quantity of monoethyl ether, the quantity of ethylene oxide adduct and also the fatty acid are shown against the corresponding Example number in Table 1 below, followed by the quantities of sodium hydroxide and water used and other optional auxiliaries.

TABLE 1

| Example No. | Monoethyl ether | EO-adduct | Fatty acids | Sodium hydroxide | Water | Auxiliaries |
|---|---|---|---|---|---|---|
| 1 | 775 g | 20 g | 20 g myristic acid | 185 g 2.2% | — | — |
| 2 | 775 g | 20 g | 20 g palmitic acid | 104 g 3.5% | 81 g | — |
| 3 | 775 g | 20 g | 20 g stearic acid | 92 g 3.5% | 92 g | — |
| 4 | 555 g | 18 g | 21 g palmitic acid | 85 g 4.0% | 100 g | 20 g N 200 g M |
| 5 | 740 g | 22 g | 10 g palmitic acid + stearic acid | 110 g 4.0% | 90 g | 20 g P |

N = nitrocellulose type 400
M = monobutyl ether of diethylene glycol acetate
P = 30% by weight aqueous dispersion of polymethacrylic acid

STRIPPING EXAMPLES

Paint coatings were removed from 60×25 cm chipboard panels (standing upright). The lacquer or paint coating comprised from about 450 to 550 g solids/m2. The lacquer or paint coatings were applied to the required thickness (about 6 to 10 times) and left to dry for 24 hours after each application. Before the stripping paste was applied, the test specimen was stored for 36 hours at 40° C.

The time after which the coating could be scraped off the substrate using a paint scraper is shown in Table 2 below in dependence upon the paint or lacquer film to be removed. The contact temperature of the stripping paste was about 23°/25° C. The number of the Example in accordance with which the stripping paste had been prepared is shown in the last column.

TABLE 2

| Lacquer/Paint Coating | Time | Example |
|---|---|---|
| Alkyd resin | 12 hours | 1 |
| Nitro combination lacquer | 10 hours | 2 |
| Polyurethane | 2.5 hours | 3 |
| Polybutadiene-styrene latex | 9 hours | 4 |
| Polyvinylacetate (dispersion) | 8 hours | 5 |
| Polymethacrylate latex | 15 hours | 3 |

COMPARISON TESTS (a) A mixture was prepared for comparison from 20 g myristic acid, 20 g of the ethylene oxide adduct of 10 moles EO with 1 mole of a mixture of oleyl alcohol and cetyl alcohol, 775 g of the monoethyl ether of diethylene glycol, 170 g water and 15 g triethanolamine.

This mixture could not be used for stripping paint from vertical surfaces because it ran almost completely off the surface on account of its low viscosity.

(b) When the monoethyl ether of diethylene glycol used in Example 1 was replaced for comparison by the monomethyl ether, a relatively free-flowing mixture having a distinctly reduced stripping effect was obtained.

We claim:
1. A stripping paste for removing lacquer and paint coatings, said stripping paste being based on substantially involatile, low-toxicity solvents and thickeners based on fatty acid salts, and comprising:

(a) from about 94 to about 66% by weight of a diethylene glycol monoalkyl ether corresponding to the general formula

R—O—CH₂CH₂—O—CH₂CH₂—OH wherein R is an ethyl or propyl group;
(b) from about 1 to about 4% by weight of the sodium salt of a $C_{14}$-$C_{18}$ fatty acid; and
(c) from about 5 to about 30% by weight of water, all weights being based on the weight of said stripping paste.

2. A stripping paste in accordance with claim 1 including up to about 5% by weight of nonionic or anionic wetting agents and other thickening agents.

3. A stripping paste in accordance with claim 1 wherein said diethylene glycol monoalkyl ether is present in an amount of from about 88 to about 72% by weight.

4. A stripping paste in accordance with claim 1 wherein said sodium salt of said fatty acid is present in an amount of from about 1.5 to about 3% by weight.

5. A stripping paste in accordance with claim 1 wherein said water is present in an amount of from about 10 to about 25% by weight.

6. A stripping paste in accordance with claim 1 including about 5 to about 10% by weight of $C_2$-$C_6$ monoalkyl ethers of diethylene glycol acetate and/or propionate.

7. A stripping paste in accordance with claim 1 wherein between about 20 to about 50% of the carbon bonds of said fatty acids are unsaturated.

8. A method of removing lacquer and paint coatings from a substrate comprising applying a stripping paste to said coatings wherein said stripping paste comprises:
(a) from about 94 to abut 66% by weight of a diethylene glycol monoalkyl ether corresponding to the general formula

R—O—CH₂CH₂—O—CH₂CH₂—OH wherein R is an ethyl or propyl group;
(b) from about 1 to about 4% by weight of the sodium salt of a $C_{14}$-$C_{18}$ fatty acid; and
(c) from about 5 to about 30% by weight of water, all weights being based on the weight of said stripping paste.

9. A method in accordance with claim 8 wherein said stripping paste contains up to about 5% by weight of nonionic or anionic wetting agents and other thickening agents.

10. A method in accordance with claim 8 wherein said diethylene glycol monoalkyl ether is present in an amount of from about 88 to about 72% by weight.

11. A method in accordance with claim 8 wherein said sodium salt of said fatty acid is present in an amount of from about 1.5 to about 3% by weight.

12. A method in accordance with claim 8 wherein said water is present in an amount of from about 10 to about 25% by weight.

13. A method in accordance with claim 8 wherein said stripping paste contains about 5 to about 10% by weight of $C_2$-$C_6$ monoalkyl ethers of diethylene glycol acetate and/or propionate.

14. A method in accordance with claim 8 wherein between about 20 to about 50% of the carbon bonds of said fatty acids are unsaturated.

15. A method in accordance with claim 8 wherein said stripping paste is allowed to contact said coatings for about 2 to about 48 hours.

16. A method in accordance with claim 15 wherein said stripping paste is allowed to contact said coatings at room temperature.

17. A method in accordance with claim 16 including removing the softened coatings with a scraper.

18. A method of preparing a stripping paste for removing lacquer and paint coatings, comprising mixing at a temperature of about 20° to about 50° C. until a homogeneous mixture is obtained, the following composition:
(a) from about 94 to about 66% by weight of a diethylene glycol monoalkyl ether corresponding to the general formula

R—O—CH₂CH₂—O—CH₂CH₂—OH wherein R is an ethyl or propyl group;
(b) from about 1 to about 4% by weight of the sodium salt of a $C_{14}$-$C_{18}$ fatty acid; and
(c) from about 5 to about 30% by weight of water, all weights being based on the weight of said stripping paste.

19. A method in accordance with claim 18 including adding to said composition up to about 5% by weight of nonionic or anionic wetting agents and other thickening agents.

20. A method in accordance with claim 18 including adding to said composition about 5 to about 10% by weight of $C_2$-$C_6$ monoalkyl ethers of diethylene glycol acetate and/or propionate.

* * * * *